Aug. 20, 1963 W. A. JONES 3,100,989
BEARING PRELOAD TESTER
Filed July 19, 1960

*INVENTOR.*
WILLIAM A. JONES
BY
KENWAY, JENNEY, WITTER & HILDRETH
ATTORNEYS

United States Patent Office 3,100,989
Patented Aug. 20, 1963

3,100,989
BEARING PRELOAD TESTER
William A. Jones, Hingham, Mass., assignor to Northrop Corporation, Beverly Hills, Calif., a corporation of California
Filed July 19, 1960, Ser. No. 43,777
7 Claims. (Cl. 73—140)

This invention relates to a preload testing device for bearing assemblies, and more particularly to a testing device adapted to subject a shaft, rotatably mounted in a bearing housing by means of combination thrust and radial bearings, to an axial load and to measure the resulting axial displacement of the shaft relative to the housing. This displacement, when considered in relation to the load, may be used to deduce the spring rate of the assembly. The spring rate is determined principally by the bearing material, the angles of bearing contact, the bearing geometry, and the preload applied to the bearings by the assembly. Inasmuch as the first three of these factors are ordinarily maintained within close manufacturing tolerances, the spring rate of the assembly may be used as a measure of the preload for purposes of quality control in the manufacture of such assemblies.

The displacements involved in determining the spring rate of a bearing assembly in the aforementioned manner are on the order of millionths of an inch and it is therefore extremely important to prevent even minute random factors from biasing their measurement.

It is the primary object of my invention to provide an improved preload testing device which affords improved accuracy of measurement of the axial displacement of a shaft mounted in combination thrust and radial bearings and subjected to a predetermined axial load.

The present invention contemplates the use of a linear motion transducer for measuring the axial displacement of a shaft subjected to an axial displacing force in a bearing assembly, which displacement is of very small magnitude and thus is not susceptible to highly accurate measurement by direct mechanical means. Such a transducer may, for example, comprise a linear motion differential transformer, in which a ferromagnetic core element is attached to the shaft and moves therewith to vary the flux distribution in the transformer, thus modifying an electrical output to indicate the position of the ferromagnetic member.

The principal causes of error in measurements made by these means are misalignment of the ferromagnetic member within the airgap of the transformer, and random axial displacement induced by lateral deflection, misalignment, or axial growth of the means connecting the ferromagnetic member with the shaft of the bearing assembly. While wire may be used as a flexible connecting means to eliminate misalignment, random axial displacements induced by the wire can be expected to result in substantial inaccuracies with regard to the minute shaft displacements being measured. The use of rigid connecting means is equally objectionable because of the slight misalignment of the ferromagnetic member which will normally result. These difficulties are not restricted to linear motion differential transformers, but can be expected to arise in the use of various transducers capable of accurately measuring the axial displacements in question, on the order of millionths of an inch.

It is accordingly a further object of my invention to provide an improved preload testing device with means for reducing random axial displacements of a linear motion transducer induced by lateral deflection, misalignment, or axial growth of means connecting the transducer with the shaft of a bearing assembly whose axial displacement is measured by the testing device.

According to a preferred embodiment of my invention a testing device is provided with means for applying an axial load to the shaft of a bearing assembly, and with separate means for measuring the resulting axial displacement of the shaft in the assembly; these means are so arranged that the testing load is not transmitted to the measuring means, thereby preventing random axial displacement of the latter which would otherwise result from the application of tensile or compressive stresses thereto.

It is a feature of my invention that improved means for transmitting axial displacements of the shaft of a bearing assembly to a linear motion transducer are provided, comprising connecting means which are relatively rigid along the axis of measurement, but are flexible, normal to the axis of measurement in at least one portion thereof, to allow for misalignment. By these means, and through the action of aligning guide means for a movable element of the transducer, random axial displacements of the movable element induced by both lateral deflection and misalignment of the connecting means are reduced.

Further objects and advantages of my invention will become apparent as the following detailed description of a preferred embodiment thereof proceeds, referring to the accompanying drawing, in which.

Figure 1:
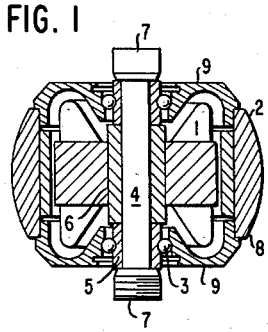
FIG. 1 is a sectional view in elevation of an illustrative bearing assembly, in an electric motor, whose preloading may be tested by means of my improved testing device.

One type of bearing assembly which is adapted to be tested by the testing device of this invention is shown in FIG. 1, comprising an electric motor which includes a stator 1 and a rotor 2. A pair of rows of ball-bearings 3 are mounted in axially spaced relation on a shaft 4, and are mounted thereon by means of a pair of inner races 5. In accordance with a co-pending application Serial No. 761,232, entitled Compensated Preloaded Bearing, of William A. Jones and Ernest W. Johnson, which is assigned to the same assignee as this application, a cylindrical spacer element 6 is positioned about the shaft between the inner races 5, and locates the races in axial abutment with hubs 7 formed on the ends of the shaft. The rotor 2 comprises a ring 8 mounted upon bearings 3 by means of a pair of resilient end cups 9, forming outer bearing races, for rotation about the shaft 4. The preload of this assembly may be controlled by adjusting the relative axial location of the inner races 5 with respect to the outer races, one method of which is described in the aforementioned application. The achievement of uniform operational characteristics of motors manufactured to this design requires that the pre-load be established at a predetermined level, in order to provide uniformity of performance with maximum bearing life.

If the outer races of the bearings are held stationary and an axial force is applied to the shaft, the pre-load of one of the bearings will increase, while that of the other bearing decreases. However, the geometry of the bearings is such that a net increase in axial force results. The bearing assembly thus acts in the manner of a very stiff spring in which axial displacement is proportional to the force exerted, over a very limited range of values. The displacement resulting from a known applied load may be used to determine the spring rate of the bearing assembly. Inasmuch as factors effecting the spring rate are maintained within close manufacturing tolerances with the exception of the pre-load applied to the bearings, the spring rate may be utilized as a practical measure of the pre-load for purposes of quality control in the manufacture of such bearing assemblies. The spring rate may be computed from the axial displacement resulting from the application of a known axial force.

Figure 2:
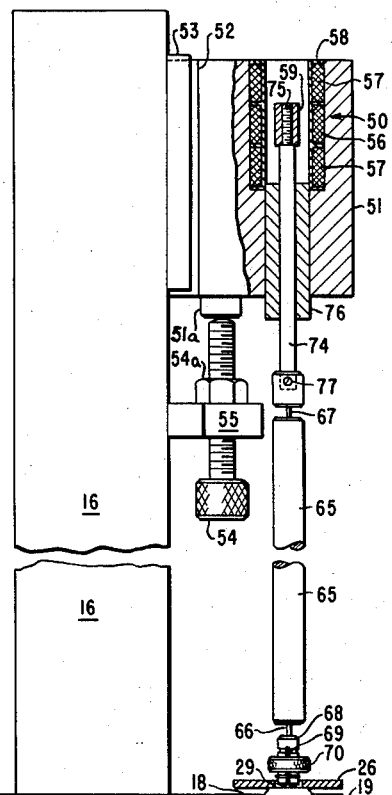
FIG. 2 is a view in side elevation and partially in section of a preferred embodiment of the testing device.
Figure 3:
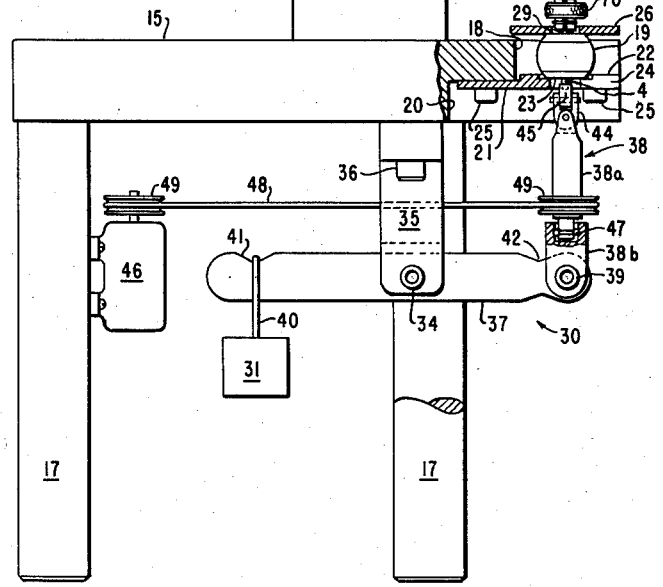
FIG. 3 is a view in front elevation of the testing device of FIG. 2.
Figure 3:
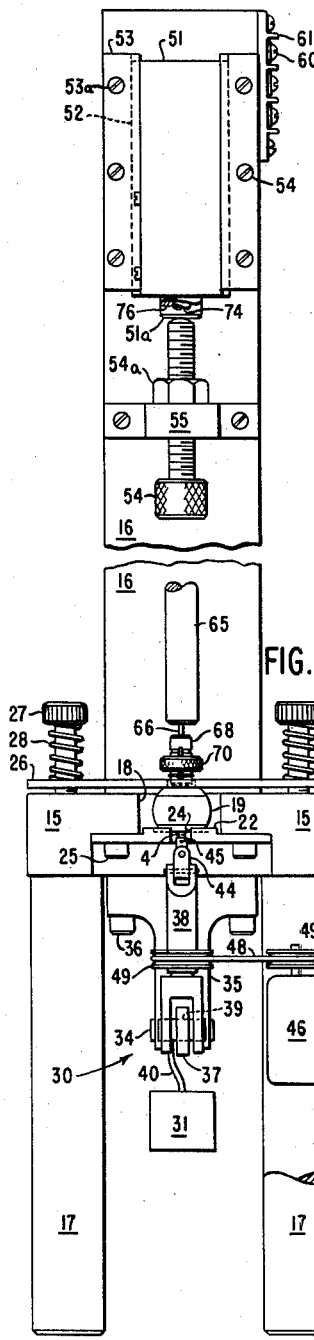

In accordance with the present invention, a testing device is provided for measuring with increased accuracy the axial displacement of such a bearing assembly when subjected to an axial load. A preferred embodiment of the improved testing device is shown in FIGS. 2 and 3, and includes a test stand 15 having a vertical standard 16 and supporting legs 17. The test stand is formed with a recess 18 for receiving a bearing assembly 19 to be tested. The recess 18 is enlarged at 20 in the lower surface of the test stand to receive a supporting plate 21 for the bearing assembly. The plate 21 is formed with an upwardly projecting annular ridge 22 to assist in position the bearing assembly thereon, and is further formed with an opening 23 for access to the shaft of the bearing assembly. The plate is split at 24 to facilitate insertion and removal of the bearing assembly, and secured in the enlarged recess 20 by means of screws 25. The bearing assembly is secured in position for testing by means of a bracket 26 which is secured to the upper surface of stand 15 by means of adjustable tension screws 27 and compression springs 28 received thereon. The bracket 26 is formed with a central opening 29 to provide access to the upper end of the bearing assembly shaft, so that the bracket bears only upon the rotor of the assembly.

Means for applying an axial load in tension or compression to the bearing assembly are provided, comprising a linkage generally designated 30, and a weight 31. The linkage 30 is rotatably mounted about a pivot 34 formed in a fulcrum bracket 35, which is secured to the lower surface of the test stand by means of screws 36. The linkage includes an arm 37 pivoted in the bracket at 34, and a link generally designated 38, which is pivoted at 39 to an end of arm 37. The weight 31 is suspended from a hook 40 in a notch 41 formed in the opposite end of the arm for exertion of a compressive load on the bearing assembly. The bearing assembly may be loaded in tension by placing the hook 40 upon a notch 42 formed near a pivot 39 in the arm, and spaced from the pivot 34 a distance equal to that of the notch 41. The shaft 4 of the bearing assembly 19 is secured to the link 38 by means of a universal joint 44 and a pin 45 internally threaded upon the shaft. Alternatively, the shaft may be secured to the link 38 by means of a collet chuck of well-known construction. The bearing assembly may be subjected to a testing load in either axial direction by these means.

In the preferred embodiment shown, a slow speed geared motor 46 is mounted on one of the legs 17 for the purpose of rotating the shaft 4 during testing. The link 38 is provided with a ball bearing 47 rotatably connecting portions 38a and 38b. The motor 46 is drivingly connected with portion 38a by means of a belt drive 48 and sheaves 49. The shaft may alternatively be rotated by hand, or by other suitable means. While it is not essential to rotate the shaft, a more accurate average reading may be obtained by doing so, because the balls 3 may be slightly out-of-round, and the races may not be perfectly cylindrical.

Near the upper end of the standard 16, a linear motion transducer generally designated 50 is supported within a vertically adjustable housing 51, which is made of a non-magnetic material such as aluminum alloy. The housing 51 is formed with slides 52 along the rear edges thereof for cooperation with a guide block 53, which is secured to the standard by means of screws 53a. The vertical position of the housing 51 is adjusted by means of an elongated machine screw 54 threaded in a bracket 55, which protrudes horizontally from the standard. A locknut 54a is provided to secure the screw 54 in adjusted position. A hardened steel screw 51a is threaded into the lower surface of the housing 51 and rests upon the end of the adjusting screw to support the housing in a vertically adjusted position.

The linear motion transducer 50 may be of any desired type which is capable of accurately measuring very small axial displacements of the bearing assembly, but is shown as a linear motion differential transformer comprising a primary coil 56 spaced axially between a pair of secondary coils 57 upon an insulating spool 58. A movable element of the transducer comprises a ferromagnetic internally threaded core or element 59. The leads of the primary coil 56 and the secondary coils 57 are connected to the terminals 60 of a terminal block 61 for external connection to a source of alternating current and to suitable output indicating means, respectively. The secondary coils are mutually connected in series opposition. Very slight movements of the core 59 relative to the coils is effective to vary the flux established between the primary coils and each of the secondary coils by varying the air gap therebetween, and will consequently produce a substantial variation in the measured output of the secondary coils. The operation of the differential transformer is well known and no further detailed description is believed necessary.

Because of the extremely small axial displacement of the bearing assembly to be measured, and the corresponding sensitivity of the linear motion transducer to very slight axial or transverse displacements of the movable element 59, the testing device is extremely sensitive to random axial displacements induced by lateral deflection or variation in length of connecting means which are provided to transmit axial displacement of the bearing assembly to the transducer. The present invention is directed toward improvement of the accuracy of the testing device through reduction of the random axial or transverse displacement of the movable element arising from these causes.

To this end, I provide connecting means comprising an elongated connecting member 65 which is not subjected to the testing load, by virtue of the arrangement of the previously described means for applying a precise predetermined load to the bearing assembly. The member 65 is loaded only by its own weight and that of the core 59, and is thus relieved of the compressive or tensile force of the testing load, which could cause it to compress, elongate, or deflect laterally, and thus axially displace or misalign the core 59 to produce a random error.

The connecting member must accommodate slight axial misalignment or wobble of the shaft 4 with respect to the movable element 59, without causing lateral or axial deflection of the movable element with respect to the coils 56 and 57. At the same time, however, the connecting member must not be subject to changes in length arising from lateral deflection or other random causes. To achieve these ends, the connecting member is made relatively rigid longitudinally and transversely over most of its length, but is formed with at least one transversely flexible portion of relatively short length. In the embodiment shown, two transversely flexible portions 66 and 67 are formed in the connecting member, and comprise segments of reduced diameter and relatively short length, spaced apart longitudinally. These flexible portions are of sufficiently small thickness or diameter to accommodate slight misalignment of the shaft 4 with respect to the element 59, but are of such short axial length that they are not subject to substantial compression or random lateral deflection; therefore, they do not induce appreciable random axial movement of the element 59. The degree of flexibility and of deflection of these portions are directly affected by variations in their thickness and length, and these factors may obviously be balanced by selection of appropriate dimensions.

For connection with shaft 4, the lower end of the member 65 is formed as a collet chuck 68 by means of radial saw-cuts 69. The shaft is inserted in an axial bore (not shown) formed in the end of the collet chuck, and secured therein by means of a ring 70 which is forced downwardly to compress the segments of the chuck into gripping engagement with the shaft.

The movable element 59 is mounted for aligned axial reciprocation in the housing 51 by means of a supporting rod 74 of non-magnetic material such as brass, having an end 75 threaded into the element. The rod 74 is slidably received in a collar 76 fitted into the housing, which is formed of brass or other hard non-magnetic material to minimize misalignment induced by wear while not affecting the magnetic circuit of the transducer. The upper end of the connecting member is secured to the rod 74 by means of a removable pin 77.

In operation, a bearing assembly 19 is secured in the test stand, and the shaft 4 is attached at opposite ends thereof to the link 38 and the connecting member 65 by means previously described. The shaft 4 and the connecting member are slowly rotated by the motor 46 to achieve accurate average measurements. Current is supplied to the primary coil through the terminal block 61. With no axial load applied to the shaft, aside from the weight of the connecting member and the movable element 59 of the transducer, the housing 51 is vertically adjusted by means of the screw 54 to a position in which the electrical output instruments connected to the secondary coils indicate that the movable element is centered relative to the secondary coils. A predetermined weight 31 is then applied to the arm 37; the weight will exert an upward axial force on the bearing assembly if placed as shown in FIG. 1, but may be placed on the notch 42 to apply a downward force. The electrical output instruments will then indicate a variation from the initial reading which is a measure of the movement of the element 59 from its centered position; this movement corresponds to the axial displacement of the shaft 4 relative to the bearing assembly. It will be apparent that the spring constant, and consequently the preload of the bearing assembly, may be readily determined by comparing the axial displacement of the bearing assembly with the applied load. Any slight misalignment of the axes of the shaft 4 and the element 59 is accommodated by the flexible portions 66 and 67, which do not, however, induce appreciable random error through lateral deflection or longitudinal compression. The accuracy of transmission of the displacement of the shaft to the transducer is further enhanced by this arrangement in that the testing load is not applied to the connecting member 65.

While I have shown and described a preferred embodiment of my invention, it will be apparent to those skilled in the art that various changes and modifications may be made without departing from the spirit and scope of the invention. For example, the shaft 4 of the bearing assembly may be mounted in the test stand, and the testing load may be applied to the rotor 8. Furthermore, various forms of linear motion transducers capable of measuring very small displacements may be used, and a wide variety of bearing assemblies other than that shown by way of illustration may be tested by means of the improved testing device. I therefore intend to cover these and other modifications in the appended claims.

What I claim and desire to secure by Letters Patent of the United States is:

1. A testing device adapted for determining the axial preload of bearing assemblies of the kind comprising a shaft member rotatably mounted in bearings supported by a housing member, said testing device comprising, in combination; means for supporting the bearing assembly, means for applying an axial displacing load to a first member of the bearing assembly, means including a linear motion transducer having a movable element for measuring the relative axial displacement of the members of the bearing assembly, and elongated connecting means extending along the axis of said first member for transmitting the axial displacement of the bearing assembly to said transducer, said connecting means including at least one transversely flexible portion of relatively short length and being relatively stiff over the remaining length thereof, said connecting means being secured to said movable element at one end thereof and adapted for connection to said first member of the bearing assembly at the other end thereof.

2. A testing device as recited in claim 1, together with means for rotating said first member of said bearing assembly.

3. A testing device adapted for determining the axial preload of bearing assemblies of the kind comprising a shaft member rotatably mounted in bearings supported by a housing member, said testing device comprising, in combination, means for supporting the bearing assembly, means for applying an axial displacing load to a first member of the bearing assembly, means including a linear motion transducer having a movable element for measuring the relative axial displacement of the members of the bearing assembly, and an elongated connecting member extending along the axis of said first member for transmitting the axial displacement of the bearing assembly to said transducer, said connecting member being formed with at least one transversely flexible portion of reduced thickness and relatively short length and being relatively thick and stiff over the remaining length thereof, said connecting member being secured to said movable element at one end thereof and adapted for connection to said first member of the bearing assembly at the other end thereof.

4. A testing device as recited in claim 3, together with means for guiding said movable element for reciprocation along the rotational axis of the bearing assembly.

5. A testing device as recited in claim 4, together with means for rotating said first member, said connecting member, and said movable element.

6. A testing device adapted for determining the axial spring constant of bearing assemblies, said testing device comprising, in combination, a test stand for supporting a first member of a bearing assembly, means secured to a relatively rotatable second member of the bearing assembly for applying a predetermined axial displacing load thereto, means for rotating said second member, a linear motion transducer having an element mounted reciprocably therein for measuring the resulting relative axial displacement of the members of the bearing assembly, said stand supporting said transducer in spaced relation to the bearing assembly for reciprocation of said element along the axis of the bearing assembly, and an elongated connecting member extending along said axis to be secured at opposite ends thereof to said second member and to said element, said connecting member including at least one transversely flexible portion of relatively short length and being relatively stiff over the remaining length thereof.

7. A testing device as recited in claim 6, in which said connecting member includes two transversely flexible portions spaced apart longitudinally therein.

References Cited in the file of this patent

UNITED STATES PATENTS

| 954,077 | Clement | Apr. 5, 1910 |
| 2,467,539 | Smith | Apr. 19, 1949 |
| 2,883,855 | Spengler | Apr. 28, 1959 |

FOREIGN PATENTS

| 716,597 | Germany | Jan. 24, 1942 |